United States Patent
Kimura et al.

[11] Patent Number: 5,911,802
[45] Date of Patent: Jun. 15, 1999

[54] CUTTING METHOD BY VIBRATORY CUTTING TOOL

[75] Inventors: Yoshihiko Kimura, Ishige-machi; Yasuhiro Fukuyoshi, Gifu-ken; Satoshi Asakura; Noboru Aoyama, both of Toyota, all of Japan

[73] Assignees: Mitsubishi Materials Corporation, Tokyo; Toyota Jidosha Kabushiki Kaisha, Toyota, both of Japan

[21] Appl. No.: 08/888,045

[22] Filed: Jul. 3, 1997

[30] Foreign Application Priority Data

Jul. 4, 1996 [JP] Japan ........................... 8-175281

[51] Int. Cl.⁶ ........................... B23B 3/00; B23B 5/00
[52] U.S. Cl. ........................... 82/1.11; 82/904; 408/17; 409/132
[58] Field of Search ........................... 82/1.11, 904; 408/17; 409/132

[56] References Cited

U.S. PATENT DOCUMENTS

| | | | |
|---|---|---|---|
| 509,115 | 5/1893 | Schneider et al. | 82/1.11 |
| 4,047,469 | 9/1977 | Sakata | 409/132 |
| 4,667,546 | 5/1987 | Dombrowski et al. | 82/104 |
| 5,113,728 | 5/1992 | Medeksza | 82/904 |
| 5,291,812 | 3/1994 | Yen et al. | 82/904 |

FOREIGN PATENT DOCUMENTS

| | | |
|---|---|---|
| 62-140701 | 6/1987 | Japan . |
| 8-300207 | 11/1996 | Japan . |

*Primary Examiner*—Andrea L. Pitts
*Assistant Examiner*—Taon Le
*Attorney, Agent, or Firm*—Oblon, Spivak, McClelland, Maier & Neustadt, P. C.

[57] ABSTRACT

A cutting method using a vibratory cutting tool enables efficient creation of chips by breaking or separating of chips, and can retard both a deterioration of machined surface roughness of a workpiece and an increase in cutting resistance. The vibration of the cutting tool is controlled so that the following expressions are satisfied when letting a period of rotation of a workpiece be T, a period of vibration of the cutting tool be $t_{total}$, the time required for the cutting edge to move from a farthest position in the feed direction to a farthest position in the direction opposite to the feed direction be $t_d$, and the time required for moving from the farthest position in the direction opposite to the feed direction to a next farthest position in the feed direction be $t_u$ in the period of vibration of the cutting edge: $T \approx t_{total} \times n + t_d$, where n is 0 or a positive integer; and $t_d \neq t_u$.

12 Claims, 6 Drawing Sheets

CUTTING METHOD BY VIBRATORY CUTTING TOOL

BACKGROUND OF THE INVENTION

1. Field of the Invention

The present invention relates to a cutting method using a vibratory cutting tool which feeds a cutting edge while vibrating in its feed direction relative to a workpiece rotated around an axis so as to cut the workpiece by turning.

2. Discussion of the Background

Figure 9:
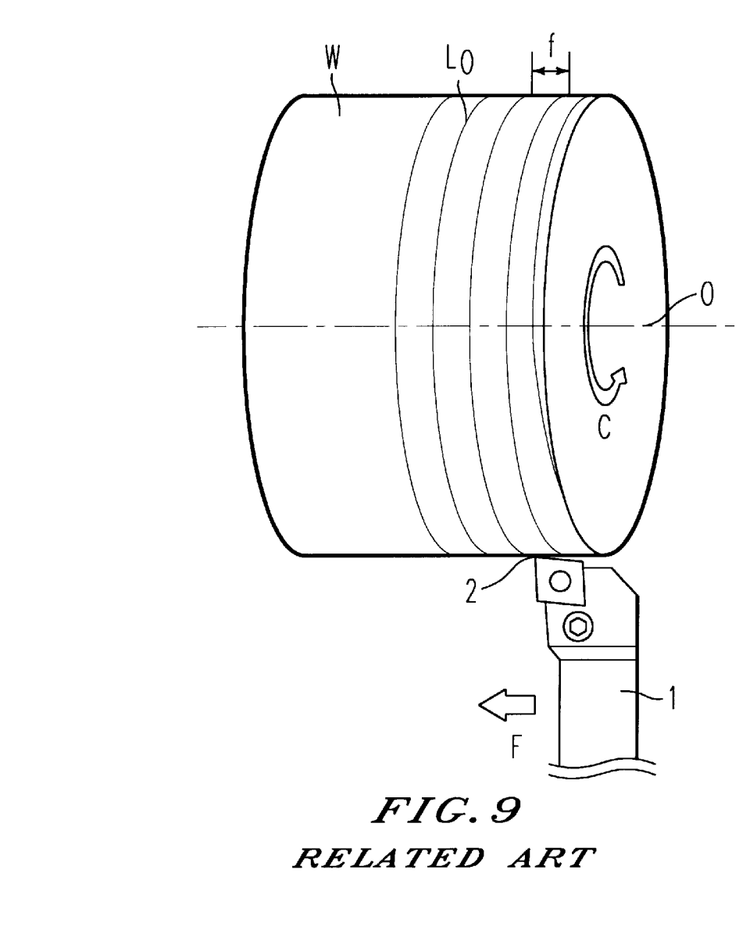
FIG. 9 is a diagram showing a cutting condition when the cutting edge is not vibrated.

In turning an outer periphery of a workpiece using a common cutting tool, a cutting tool main body 1 is fed at a constant speed in a feed direction F parallel to an axis 0 while rotating a workpiece W around the axis 0 in a rotation direction C, as shown in FIG. 9, and the outer peripheral surface of the workpiece W is cut by a cutting edge 2 attached to the tip of the cutting tool main body 1. The amount of movement of the cutting edge 2 in the feed direction F during one rotation of the workpiece W is a feed f, and the locus $L_o$ of the cutting edge 2 on the outer peripheral surface of the workpiece W becomes a spiral twisted at a fixed angle.

Therefore, the feed f can also be regarded as the spacing between the spirals in the feed direction F drawn by the locus $L_o$ of the cutting edge 2 on the outer peripheral surface of the workpiece W.

However, according to the turning using such a common cutting tool, as the locus $L_o$ of the cutting edge 2 becomes a spiral of a fixed angle as described above, continuous, flow-type chips are produced and discharged by the cutting edge 2. Such continuous chips are undesirable because they wind themselves around the workpiece W and the cutting tool main body 1 or they get caught in a chuck of a lathe so as to be rotated at high speed, so that they might interfere with a smooth cutting operation or harm a machined surface of the workpiece W and the cutting edge 2.

Thus, the separation or breaking of the chips produced by the cutting edge 2 solves the above-mentioned problems. A cutting method by a vibratory cutting tool has been proposed in which a cutting edge 2 of a cutting tool is fed in the feed direction F while being vibrated at high speed in a direction of the axis 0 of a workpiece W so as to cut the workpiece W.

Figure 10:
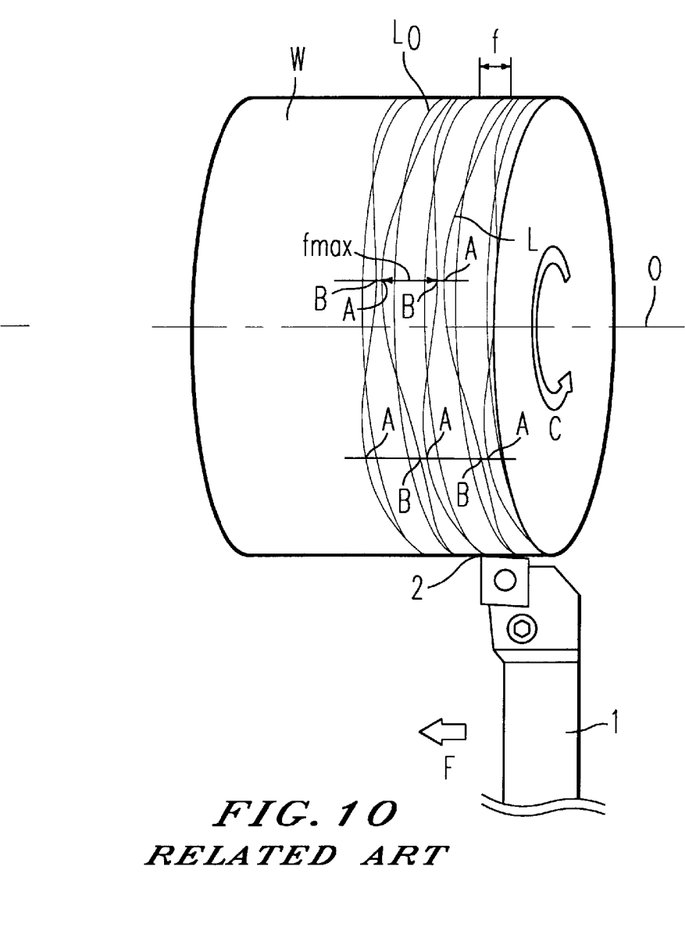
FIG. 10 is a diagram showing a conventional cutting method using a vibratory cutting tool in which a sine waveform is employed as a vibration waveform, and an amplitude a is set as a<f/2 with respect to a feed f.
Figure 11:
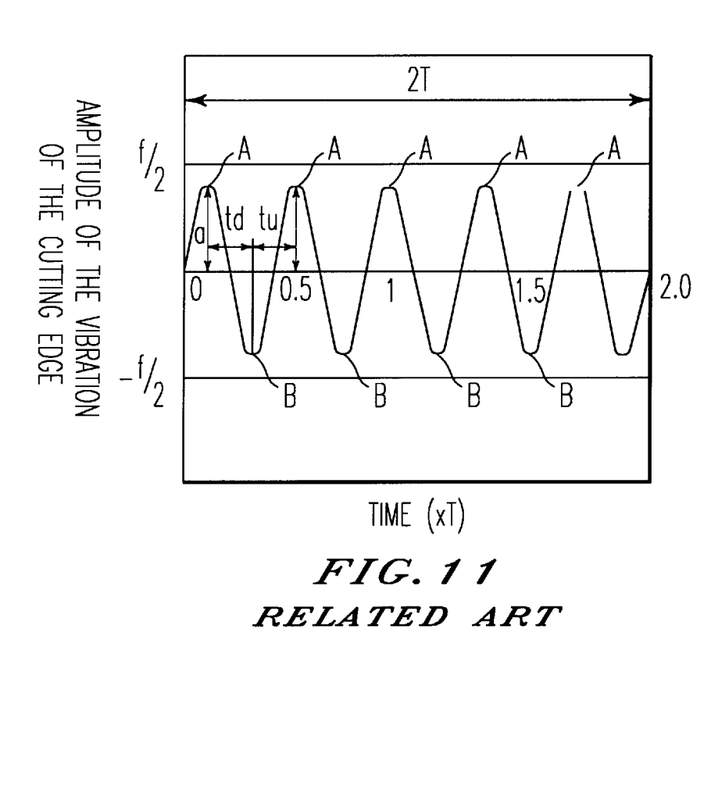
FIG. 11 is a diagram showing a vibration waveform given to the cutting edge in the conventional method by the vibratory cutting tool shown in FIG. 10.

FIGS. 10 and 11 show an example of such a cutting method by a vibratory cutting tool. The cutting edge 2 is fed together with the cutting tool main body 1 in the feed direction F while being vibrated in the direction of the axis 0 of the workpiece W at a fixed period.

Incidentally, as a means for vibrating the cutting tool main body 1 in such a vibratory cutting tool, for example, a means for swingably supporting the cutting tool main body 1 at a center portion thereof and bringing a cam rotated by a motor, etc. into abutment with the rear end of the cutting tool main body 1 in the direction of axis 0, and a vibratory cutting tool such as described in Japanese Laid-Open Publication HEI 8-300207 (Japanese Patent Application No. 7-108670) which was previously filed by the present Applicant in which the cutting tool main body 1 is provided with an elastically deformable low-stiffness section, with a portion ahead of the low-stiffness section intermittently pressed in the direction of axis 0 by a direct-acting actuator so as to vibrate the cutting edge 2 at the tip of the cutting tool main body 1 can be employed.

In the example shown in FIG. 10, the cutting tool main body 1 is subjected to a sine waveform vibration as shown in FIG. 11. The locus $L_o$ is formed under conditions of no vibration. The locus L of the cutting edge 2 extends spirally about the locus $L_o$, while moving wavily in the direction of axis 0.

However, if the amplitude a of the vibration is less than f/2, as shown in FIG. 11, and the relationship represented by the following expression (1) are satisfied when letting a period of rotation of the workpiece W be T and a period of vibration of the cutting tool main body 1, i.e., the cutting edge 2, be $t_{total}$, a position A where the cutting edge 2 moves farthest in the feed direction F (hereinafter, referred to as a front end position), and a position B where the cutting edge 2 moves farthest opposite to the feed direction F (hereinafter, referred to as a rear end position) are located close to each other in the direction of axis 0 in the region between both spiral loci L of the cutting edge 2 in the direction of axis 0:

$$2T = t_{total} \times N \quad (1)$$

where N is an odd number of 1 or more.

That is, with respect to a certain front end position A on the locus L, the rear end position B is located at a position the cutting edge reached after going round in the direction opposite to the rotation direction C of the workpiece W along the locus L from the front end position A, and hence, the spacing in the direction of axis 0 between the spirals drawn by the locus L of the cutting edge 2 become narrow at a portion where the front end position A and the rear end position B are close to each other. Furthermore, the width of the chips produced by the cutting edge 2 also become narrow at this portion, thus they are likely to be broken. Incidentally, FIGS. 10 and 11 show the example of a case where N=5.

Figure 12:
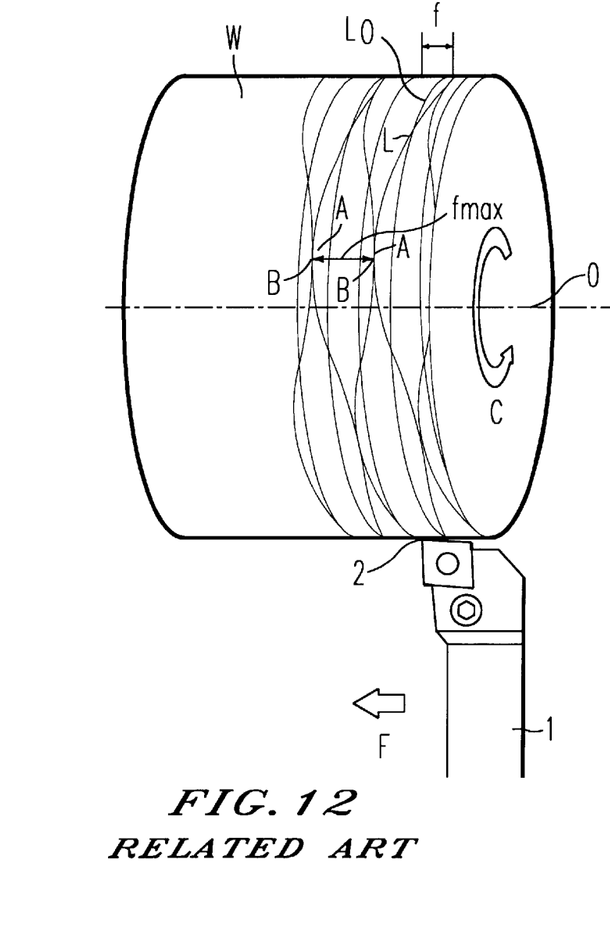
FIG. 12 is a diagram showing a conventional cutting method using a vibratory cutting tool in which a sine waveform is employed as a vibration waveform, and the amplitude a is set as a=f/2 with respect to the feed f.

In addition, FIG. 12 shows a case where the amplitude a of the vibration of the cutting edge 2 equals f/2, and N=5. In this case, the front end position A coincides with the rear end position B, so the chips are completely separated.

Incidentally, when the above-described expression (1) is satisfied the locus L of the cutting edge 2 provides for a front end position A located at a position the cutting edge 2 reached after going round in the direction opposite to the rotation direction C of the workpiece W along the locus L from a certain rear end position B, and the spacing between the spirals drawn by the locus L in the feed direction F is a maximum at this portion. Here, as mentioned above, the feed f of the cutting edge 2 is the spacing between the loci L in the feed direction F. Thus, when letting the maximum value of the feed f be the maximum feed $f_{max}$, the maximum feed $f_{max}$ in the above case corresponds to a distance in the feed direction F between the rear end position B and the front end position A in which the spacing between the spirals drawn by the locus L is a maximum. When a<f/2, $f_{max}=f+2a$, and when a=f/2 so that the chips are completely separated, $f_{max}=2f$.

On the other hand, however, it is generally known that surface roughness of the workpiece W in the turning operation by the cutting tool deteriorates as the feed f increases. For example, the maximum height $R_{max}$ of surface roughness of the workpiece W in the direction of axis 0 (lateral roughness) is represented by the following expression (2) as an approximate expression:

$$R_{max} = f^2/8R \quad (2)$$

where R is the radius of the cutting edge 2.

That is, the surface roughness $R_{max}$ of the workpiece W is proportional to the square of the feed f. Therefore, when $f_{max}=2f$ so that the chips are completely separated by the vibratory cutting tool as mentioned above, for example, the surface roughness $R_{max}$ increases by four times the feed amount f causing no vibration of the cutting tool at a portion where the spacing between the loci L in the feed direction F is a maximum, thus causing remarkable deterioration in machined surface roughness.

In addition, at a portion on the locus L where the cutting edge 2 moves from the rear end position B to the front end position A, the feed f of the cutting edge 2 gradually increases to the maximum feed $f_{max}$.

However, as the feed f of the cutting edge 2 locally increases, cutting resistance acting on the cutting edge 2 of the portion also increases. Thus, when the maximum feed $f_{max}$ is large, there arises a problem in that the cutting edge 2 is likely to be chipped due to increased cutting resistance.

The present invention is made under the circumstances as described above, and has its object to provide a cutting method using a vibratory cutting tool which can retard both a deterioration of machined surface roughness of a workpiece and an increase in cutting resistance while enabling efficient operation by using a vibratory cutting tool for breaking or separating chips.

SUMMARY OF THE INVENTION

In order to solve the above problems and to accomplish the object according to the present invention, there is provided a cutting method using a vibratory cutting tool for feeding a cutting edge attached to the tip of a cutting tool main body while vibrating in its feed direction relative to a workpiece rotated around an axis so as to cut the workpiece. Wherein the vibration of the cutting edge is controlled so that the following expression (3) and $t_d \neq t_u$ are satisfied, when letting a period of rotation of the workpiece be T, a period of vibration of the cutting edge be $t_{total}$, and further when letting the time required for the cutting edge to move from a farthest position in the feed direction to a farthest position in the direction opposite to the feed direction be $t_d$, and the time required for moving from the farthest position in the direction opposite to the feed direction to a next farthest position in the feed direction be $t_u$ in the period of vibration of the cutting edge:

$$T \approx t_{total} \times n + t_d \tag{3}$$

where n is 0 or a positive integer.

Here, according to the conventional sine wave vibration of the cutting edge, the time $t_d$ required for the cutting edge to move along its locus L from the front end position A to the rear end position B will equal the time $t_u$ required for moving from the rear end position B to the front end position A. Therefore, in order to break or separate chips, if the rear end position B is set so as to be located at a position the cutting edge reached after going round in the direction opposite to the workpiece rotation direction C along the locus L from a certain front end position A close to or coincident with the front end position in the feed direction F, i.e., so as to satisfy the above expression (1), the front end position A is always located in the feed direction F relative to the rear end position B at a position the cutting edge reached after next going round in the direction opposite to the workpiece rotation direction C from the rear end position B, so that the spacing between the spiral loci L is a maximum as described above at a portion between these rear end position B and the front end position A. This is true for other waveforms, instead of being limited to the sine waveform, if $t_d = t_u$ is satisfied.

However, as in a cutting method of the present invention, i.e., the time $t_d$ required for the cutting edge to move from the front end position A to the rear end position B and the time $t_u$ required for moving from the rear end position B to the front end position A are set to $t_d \neq t_u$, i.e., set to be unequal, in order to set the rear end position B to be located at a position where the cutting edge reached after going round in the workpiece rotation direction C from a certain front end position A for breaking or separating chips, the relationship represented by the following expression (4) may be satisfied:

$$T = t_{total} \times n + t_d \tag{4}$$

where n is 0 or a positive integer.

In this case, however, it is apparent from the expression (4) that the period of rotation T of the workpiece is longer than n-times the period of vibration $t_{total}$ of the cutting edge by the time $t_d$ required for the cutting edge to return from the front end position A to the rear end position B. Thus, unlike the conventional cutting method, the front end position A is not located at a position where the cutting edge reached after going round in the direction opposite to the workpiece rotation direction C along the locus L from a certain rear end position B.

Along with this, a maximum value of a distance in the feed direction F of the spiral drawn by the locus L of the cutting edge, i.e., a maximum feed $f_{max}$ is also shorter than the conventional distance between the rear end position B and the front end position A, so that the surface roughness $R_{max}$ can be reduced based on the above expression (2), and increase in cutting resistance acting on the cutting edge can be retarded.

In order to facilitate breaking of chips, narrow portions can be formed in the chips by setting the amplitude a of the vibration of the cutting edge to a<f/2 as described above so as to bring the front end position A on the locus L close to the rear end position B reached after going round in the direction opposite to the workpiece rotation direction C in the feed direction F, or by bringing the front end position A and the rear end position B close to each other in a circumferential direction of the workpiece. In this case, the expression (4) does not have to hold strictly. This is true when the amplitude a of the vibration of the cutting edge is sufficiently large, when the workpiece W is of a relatively brittle material and chips can be broken even if they are not too thinned, and when at least one of the peak and trough of the vibration waveform of the cutting edge is flat as described later.

Thus, the expression (3) is adopted in the present invention in place of the expression (4).

Incidentally, even if the expression (4) does not have to hold strictly as described above, the vibration of the cutting edge may preferably be controlled so that the following expression is satisfied:

$T-0.3t_{total} \leq t_{total} \times n + t_d \leq T+0.3t_{total}$, i.e., so that the right side of the expression (3) $t_{total} \times n + t_d$ falls in the range of $T0.3t_{total}$ to $T+0.3t_{total}$. This is because an increase in the difference between the right side $t_{total} \times n + t_d$ and the period of rotation T of the workpiece W to such an extent of exceeding the above range increases excessively the spacing between the front end position A and the rear end position B in the circumferential direction of the workpiece W too much and increases the width of the narrow portion where the chips are produced, so that breaking of the chips, sometimes, becomes difficult.

Also, a substantially triangular waveform may be adopted as the vibration waveform of the cutting edge. When such a waveform is adopted, the locus L of the cutting edge is bent with an angle at the front end position A and the rear end position B, so that similar angled portions are formed at the narrow portions of chips, thereby facilitating a positive breaking of the chips.

Additionally, a substantially curved waveform may also be adopted as the vibration waveform of the cutting edge. In this case, since the speed of the vibrating cutting edge changes smoothly, an excessive load is not put on the cutting edge. Therefore, the cutting edge can be more securely prevented from being chipped, and the vibration can be controlled with relative ease.

Further, even in a case where these waveforms or other waveforms are employed, by employing the vibration waveform in which at least one of the peak and trough thereof is flat, the locus L drawn by the cutting edge takes the form such that the front end position A and the rear end position B extend in the circumferential direction of the workpiece W. This increases the portion where the front end position A comes close to, or is coincident with the rear end position B reached after going round therefrom in the direction opposite to the rotation direction C of the workpiece W. Thus, even if the expression (4) is not strictly satisfied due to slight variance in the speed of rotation of the workpiece W, the chips can be broken or separated.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
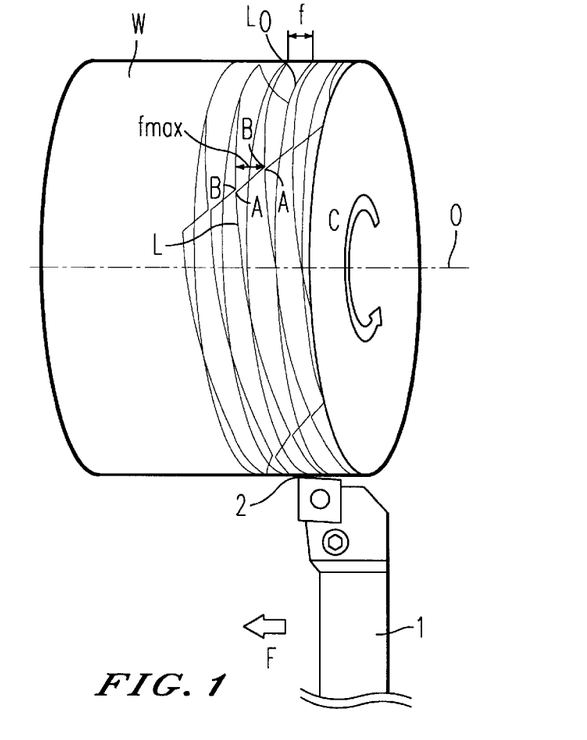
FIG. 1 is a diagram showing a first embodiment of the present invention.
Figure 2:
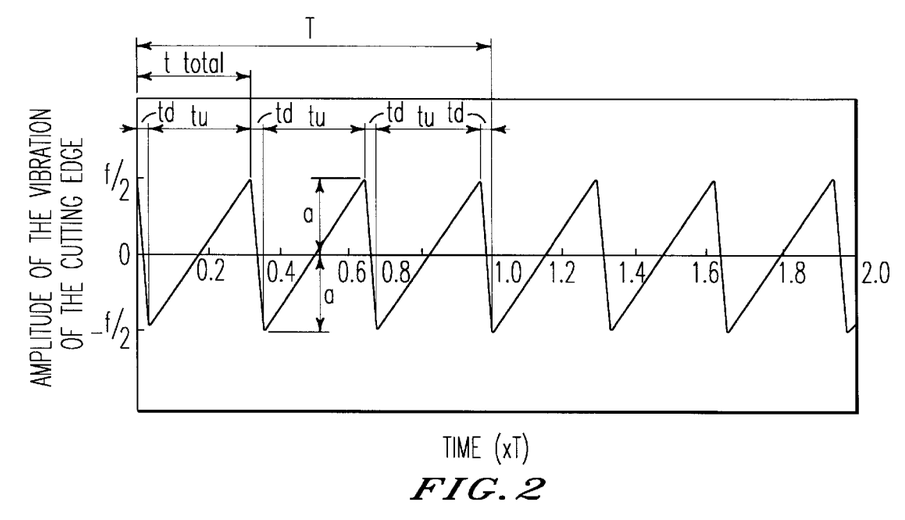
FIG. 2 is a diagram showing a vibration waveform of a cutting edge of the first embodiment shown in FIG. 1.

FIGS. 1 and 2 show a first embodiment in which the present invention is applied to a cutting of an outer periphery of a workpiece W. Furthermore, in the drawings of this invention, the same components common to those of a conventional cutting method using a vibratory cutting tool shown in FIGS. 10 and 11 are indicated by the same reference numerals so as to simplify an explanation.

Incidentally, in the first embodiment and in other embodiments described later, similar to the vibratory cutting tool as described above, a means for swingably supporting the cutting tool main body 1 at a center portion thereof and bringing a cam rotated by a motor, etc. into abutment with the rear end of the cutting tool main body 1 in the direction of axis 0, or a vibratory cutting tool such as described in Japanese Laid-Open Publication HEI 8-300207 (Japanese Patent Application No. 7-108670) in which the cutting tool main body 1 is provided with an elastically deformable low-stiffness section, with a portion ahead of the low-stiffness section intermittently pressed in the direction of axis 0 by a direct-acting actuator so as to vibrate the cutting edge 2 at the tip of the cutting tool main body 1 can be employed as a means for vibrating the cutting tool main body 1.

In the first embodiment, a vibration waveform of the cutting edge 2 is a triangular waveform, as shown in FIG. 2, and the amplitude a of the vibration is set as a=f/2. In the period of vibration $t_{total}$ of the cutting edge 2, the time $t_d$ required for the cutting edge 2 to move from the front end position A where the cutting edge 2 moved farthest in the feed direction F to the rear end position B where the cutting edge 2 moved farthest opposite to the feed direction F is set to T/40 with respect to the period of rotation T of the workpiece W, and the time $t_u$ required for the cutting edge 2 to move from the rear end position B to the next front end position A is set to 3×T/10. Therefore, they are set as $t_d<t_u$, i.e., $t_d \neq t_u$ and the expression (4) i.e., $T=t_{total} \times n+t_d$ is satisfied when n=3.

The locus L on the outer peripheral surface of the workpiece W drawn by the cutting edge 2 vibrated as described above will move, in its period of vibration $t_{total}$, in such a manner that it gently extends in the feed direction F from the rear end position B in the direction opposite to the rotation direction C of the workpiece W to reach the front end position A, and bends at the front end position A and then extends in the direction opposite to the feed direction F at a steep angle to reach the rear end position B, as shown in FIG. 1. In addition, the locus L takes the form of spirals in the feed direction F along a locus $L_o$ drawn when no vibrations are present as it moves in the direction opposite to the rotation direction C of the workpiece while repeating movement in the feed direction F and the direction opposite to the feed direction F.

On the locus L, the cutting edge 2 moves three times in the feed direction F and four times in the direction opposite to the feed direction F, during one rotation of the workpiece W, relative to a certain front end position A in the direction opposite to the workpiece rotation direction C. For this reason, the cutting edge 2 reaches a rear end position B after going round the workpiece W from the front end position A after its fourth movement in the direction opposite to the feed direction F is located. Moreover, since the amplitude a of the vibration of the cutting edge 2 is equal to ½ of the feed f, the front end position A and the rear end position B are arranged in agreement with the feed direction F. Therefore, material removed by the cutting edge 2 vibrated as described above is separated at least into three chips at the position when the front end position A agrees with the rear end position B during one round of the workpiece W.

Incidentally, when the amplitude a of the vibration of the cutting edge 2 is set as a<f/2, the front end position A and the rear end position B reached after going round the workpiece W therefrom do not agree with each other, but come close to each other in the feed direction F, whereby narrow portions are formed in the material removed, and breaking of the chips are facilitated therefrom.

On the other hand, on the locus L, a position reached after going round the workpiece W in the direction opposite to the workpiece rotation direction C from a certain rear end position B is a position on the way of the locus L from the rear end position B to the next front end position A. The position is located farther than the front end position A opposite to the feed direction F, and, unlike the conventional method, the front end position A is not located in the feed direction F in-line with the rear end position B.

Therefore, the maximum feed $f_{max}$ at this time becomes $f_{max} < f+2a$, and in this embodiment where $a=f/2$, it becomes $f_{max} < 2f$, so that the maximum feed $f_{max}$ can be reduced with respect to $f_{max}=2f$ in the conventional method employing a sine waveform.

Here, when a vibration waveform of the cutting edge 2 is a triangular waveform as in the case of this embodiment, the maximum feed $f_{max}$ satisfies the following expression (5):

$$f_{max} = t_{total} \times f/\max(t_u, t_d) \quad (5)$$

where $\max(t_u, t_d)$ represents a larger value of $t_u$ or $t_d$.

Therefore, the maximum feed $f_{max}$ decreases as the difference between the $t_d$ and $t_u$ increases.

For example, if $t_d/t_u$ is set to 2 or more, or ½ or less, the maximum feed $f_{max}$ becomes $f_{max} \leq 1.5f$ even if a is set as $a=f/2$ so that the chips are separated as described above, and an increment of the maximum feed $f_{max}$ due to the vibration excluding a normal feed f is reduced by half as compared with the sine waveform where $f_{max}=2f$, so that a substantial reduction in the maximum feed $f_{max}$ can be achieved. In the first embodiment, $\max(t_u, t_d)=t_u$, because $t_d=T/40$, and $t_u=3T/10$, so that the maximum feed $f_{max}$ further decreases to $f_{max} \approx 1.08f$.

However, since the surface roughness $R_{max}$ of the workpiece W is proportional to the square of the feed according to the expression (2), the surface roughness $R_{max}$ decreases proportionally with its square by reducing the maximum feed $f_{max}$ as described above in a cutting operation by the vibratory cutting tool of the present invention. Therefore, when a conventional vibration is employed where $t_d=t_u$ the surface roughness $R_{max}$ of the workpiece W deteriorates up to the four times as compared to the feed f when there is no vibration. The deterioration is retarded to 2.25 times when $t_d/t_u$ is set to 2 or more, or to ½ or less as described above, and further, to 1.17 times in the first embodiment, so that deterioration in the surface roughness $R_{max}$ can be retarded to such an extent that the surface roughness is about the same as when no vibrations are present while securely achieving separation of chips.

In addition, as the maximum feed $f_{max}$ is reduced, a maximum value of cutting resistance, which increases upon movement of the cutting edge 2 in the feed direction F, is also reduced. Therefore, according to this embodiment, a situation in that the cutting edge 2 is chipped or damaged due to an increase in cutting resistance can be prevented.

According to a cutting method using a vibratory cutting tool of the first embodiment, the increase in the maximum feed $f_{max}$ can be retarded while chips are produced to be completely separated by vibrating the cutting edge 2. Therefore, a situation where the produced chips wind themselves around the workpiece W and the cutting tool main body 1 or get caught in a chuck of a lathe so as to be rotated at high speed to interfere with a smooth cutting operation, and the machined surface of the workpiece W and the cutting edge 2 are harmed by the chips can be prevented, thus facilitating efficient creation of the chips. In addition, deterioration in the surface roughness $R_{max}$ of the workpiece W is prevented, so that a machined surface roughness can be improved, and the cutting edge 2 can be prevented from being chipped or damaged, thus extending the life of the cutting tool.

Figure 3:
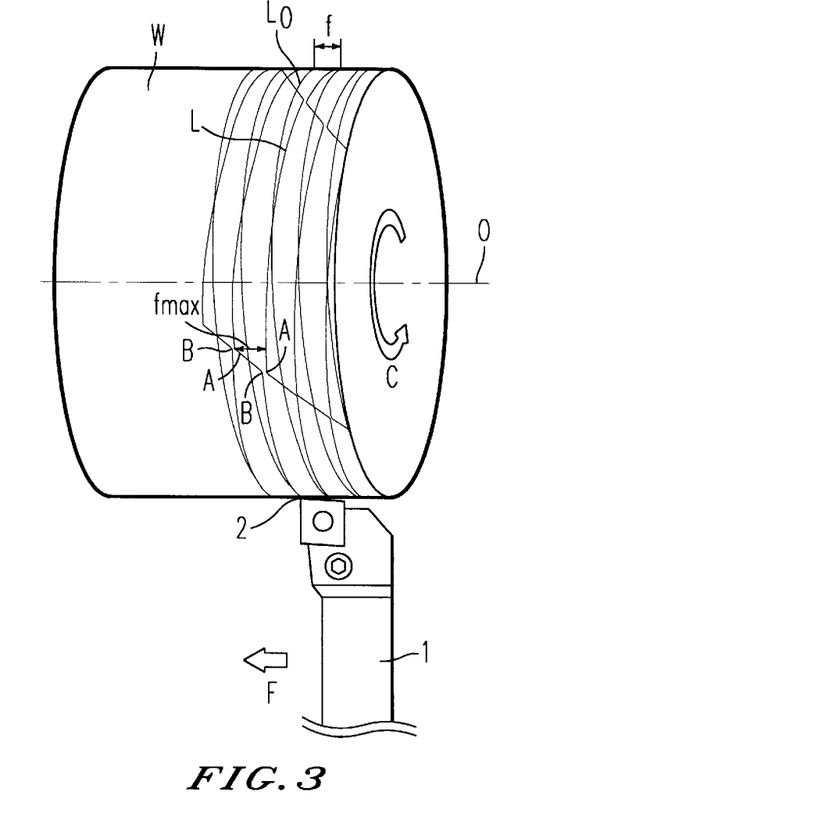
FIG. 3 is a diagram showing a second embodiment of the present invention.
Figure 4:
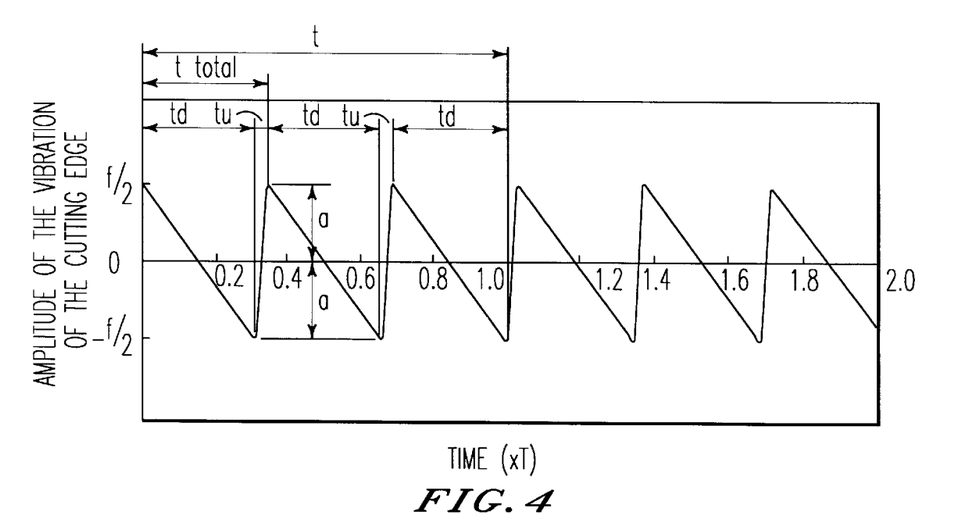
FIG. 4 is a diagram showing a vibration waveform of a cutting edge of the second embodiment shown in FIG. 3.

FIGS. 3 and 4 show a second embodiment of the present invention. The second embodiment is comparable to the first embodiment in that a vibration waveform of the cutting edge 2 is a triangular waveform, and the amplitude a is set as $a=f/2$, as shown in FIG. 4. In the second embodiment, however, the time $t_d$ required for the cutting edge 2 to move from the front end position A to the rear end position B is set as $t_d=19T/60$, and the time $t_u$ required for moving from the rear end position B to the front end position A is set as $t_u=T/40$.

That is, according to the second embodiment, $t_d$ and $t_u$ are set as $t_d \neq t_u$ by setting them as $t_d > t_u$, and the expression (4) is satisfied when $n=2$.

Contrary to the first embodiment, the cutting edge 2 vibrated as descried above draws a locus L in the direction opposite to the workpiece rotation direction C repeating movement such that it reaches the front end position A from the rear end position B at a steep angle and gently extends to the rear end position B after bending at the front end position A, as shown in FIG. 3.

Since the amplitude $a=f/2$, and the expression (4) is also satisfied in the second embodiment, the rear end position B is located in agreement with the front end position A at a position the cutting edge 2 reached after going around in the direction opposite to the workpiece rotation direction C from the front end position A, whereby chips are produced in separation.

In addition, since the vibration waveform of the cutting edge 2 is also the triangular waveform in the second embodiment, the maximum feed $f_{max}$ thereof becomes as $f_{max} \approx 1.08f$ when $\max(t_u, t_d)=t_d$ in the above expression (5), which is the same as that of the first embodiment. Therefore, in the second embodiment, similar to the first embodiment, deterioration in the surface roughness $R_{max}$ of the workpiece due to vibration of the cutting edge 2 can be retarded while securely separating the chips, and the increase in cutting resistance acting on the cutting edge 2 can be reduced.

Furthermore, when the vibration waveform of the cutting edge 2 is the triangular waveform as in the first and second embodiments, the locus L drawn by the cutting edge 2 changes its orientation in such a manner that it bends at the front end position A and the rear end position B at an obtuse angle, whereby the chips are produced in a shape bending at the front end position A and the rear end position B.

Therefore, even if $a<f/2$ so that narrow portions are formed in the chips as well as $a=f/2$ so that the chips are completely separated, the narrow portions are formed between the front end position A and the rear end position B where the chips are formed into a bending shape, and breaking of the chips can be facilitated from the bending portions, thus achieving a more positive treatment of the chips.

Figure 5:
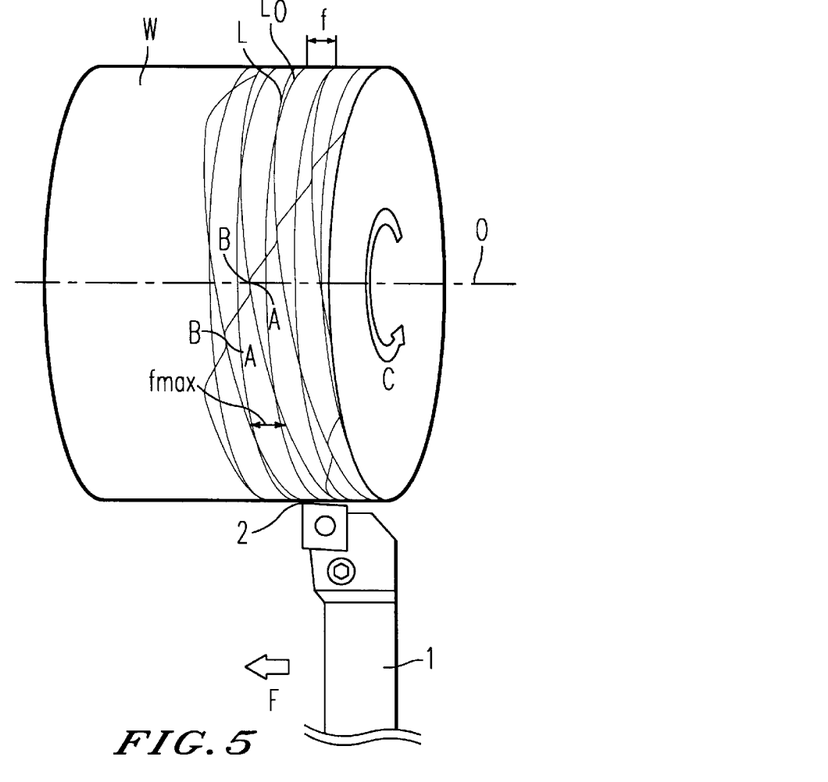
FIG. 5 is a diagram showing a third embodiment of the present invention.
Figure 6:
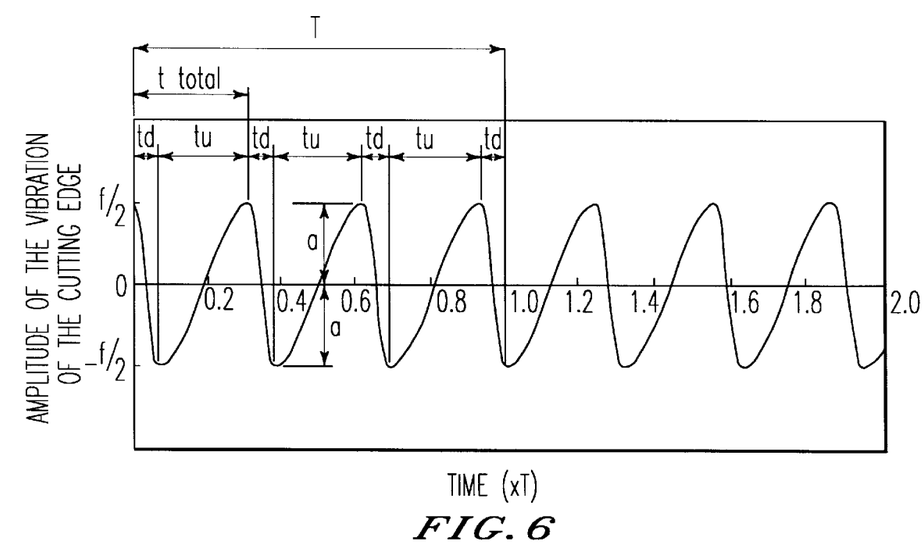
FIG. 6 is a diagram showing a vibration waveform of a cutting edge of the third embodiment shown in FIG. 5.

FIGS. 5 and 6 show a third embodiment of the present invention.

In the third embodiment, a curved waveform is adopted for the vibration waveform of the cutting edge 2, as shown in FIG. 6, while the triangular waveform is adopted in the first and second embodiments. In the third embodiment, however, the amplitude a of the vibration of the cutting edge 2 is also set as a=f/2 so that the chips are completely separated, $t_d$ and $t_u$ are set to be unequal by setting them as $t_d<t_u$, and the expression (4) is satisfied when n=3. The rear end position B is located at a position reached after going round the workpiece W in the direction opposite to the workpiece rotation direction C from a certain front end position A on the locus L of the cutting edge 2 in agreement with the front end position A.

Therefore, according to the third embodiment, the maximum feed $f_{max}$ is retarded by setting $t_d \neq t_u$ while securely separating the chips to achieve efficient creation thereof, whereby deterioration in the surface roughness $R_{max}$ can be prevented, thus providing an excellent machined surface. In addition, the cutting edge 2 can be prevented from being chipped or damaged, thus extending tool life.

In addition, by adopting the curved waveform as in the third embodiment, the speed and orientation of the movement of the vibrating cutting edge 2 are changed smoothly, so that an excessive load is not put on the cutting edge 2. Therefore, a situation that the cutting edge 2 is chipped or damaged can be more securely prevented, combined with a fact that the increase in cutting resistance acting on the cutting edge 2 can be restricted by controlling the maximum feed $f_{max}$, thereby achieving further extension of tool life.

Moreover, since the speed and the orientation of the cutting edge 2 are changed smoothly as described above, the vibration of the cutting edge 2 can be controlled with relative ease and with precision. Therefore, the third embodiment offers the advantage that separation or breaking of the cutting edge is more securely prevented, and an improvement of the machined surface roughness can be achieved.

Figure 7:
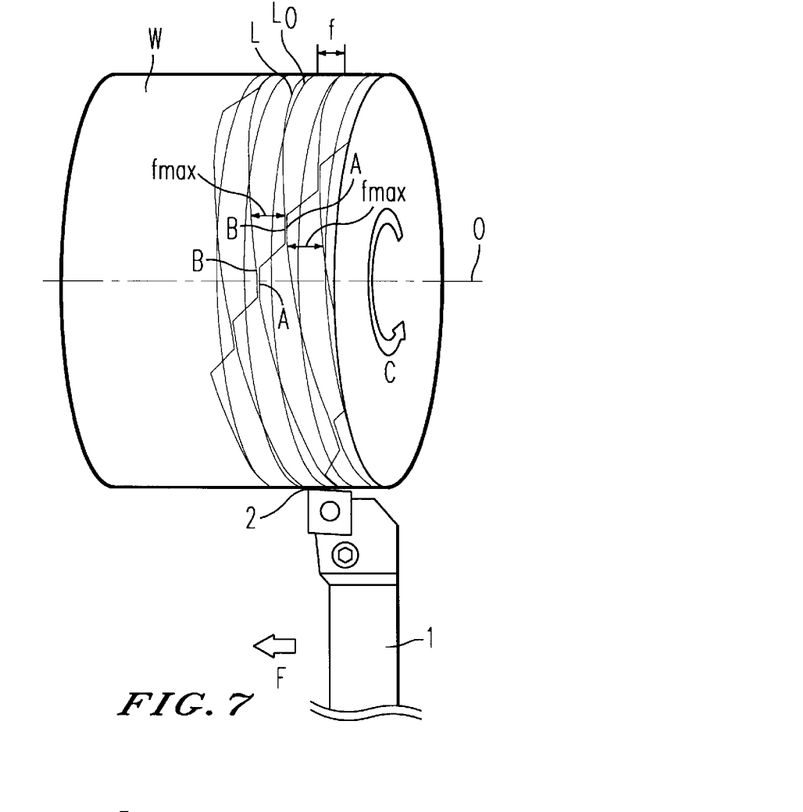
FIG. 7 is a diagram showing a fourth embodiment of the present invention.
Figure 8:
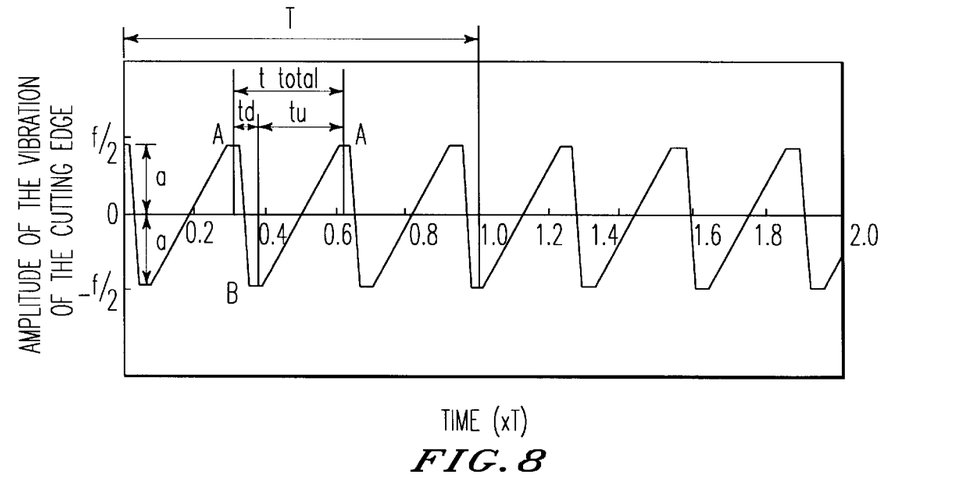
FIG. 8 is a diagram showing a vibration waveform of a cutting edge of the fourth embodiment shown in FIG. 7.

Next, FIGS. 7 and 8 show a fourth embodiment of the present invention. The fourth embodiment is characterized in that the vibration waveform of the cutting edge 2 is a waveform such that the peak and trough thereof are parallel to time axis, i.e., the peak and trough are flat. Therefore, since the cutting edge 2 does not vibrate at the peak and the trough of the waveform, the locus L drawn by the cutting edge 2 extends at its front end position A and the rear end position B parallel to the locus $L_o$ drawn, when no vibration is present, along the workpiece rotation direction C.

Incidentally, in the vibration waveform of the fourth embodiment, the portions other than the top and trough are set to form a triangular waveform similar to the vibration waveform of the first embodiment shown in FIG. 2. Therefore, the vibration waveform in the fourth embodiment takes the overall form of an unequal-sided partial trapezoid.

In the fourth embodiment, $t_d$ and $t_u$ are also set to be unequal by setting them as $t_u>t_d$, and the expression (4) is satisfied when n=3. In the fourth embodiment, however, the time $t_d$ required for the cutting edge 2 to move from the front end position A to the rear end position B in the period of vibration $t_{total}$ is taken as the time between a midpoint of a flat portion of the peak of the waveform and a midpoint of a flat portion of the trough, and the time $t_u$ required for moving from the rear end position B and the front end position A is taken as a time between a midpoint of a flat portion of the trough and a midpoint of a flat portion of the peak, as shown in FIG. 8.

In addition, in the forth embodiment, the amplitude a is set to be as a<f/2, and hence, the front end position A on the locus L and the rear end position B located at a position reached after going round the workpiece W from the front end position A in the direction opposite to the workpiece rotation direction C are arranged close to each other in the feed direction F.

However, in the cutting method according to the fourth embodiment, $t_d$ and $t_u$ are set as $t_d \neq t_u$ and the expression (4) is satisfied. Thus, narrow portions can be formed in the material removed by the cutting edge 2 for facilitating its breaking, thus achieving efficient creation of the chips. In addition, deterioration in the surface roughness $R_{max}$ and increase in cutting resistance can be prevented by controlling the maximum feed $f_{max}$, thus providing an excellent machined surface roughness and tool life.

Moreover, in the fourth embodiment, the peak and the trough of the vibration waveform of the cutting edge are flat as described above, whereby the front end position A and the rear end position B are extended along the workpiece rotation direction C on the locus L of the cutting edge 2. For this reason, the portion where the front end position A and the rear end position B come close to each other in the feed direction F can be secured over long portions of the workpiece rotation direction C. Therefore, when the rotational speed of the workpiece W varies more or less so as to shift the front end position A and the rear end position B in the workpiece rotation direction C, the narrow portions can be securely formed in the chips, thus facilitating its breaking.

Although both of the peak and the trough of the vibration waveform of the cutting edge 2 are flat in the fourth embodiment, the narrow portions can be securely formed in the chips when one of them is flat and the other one is kept as the triangular waveform shown in FIGS. 2 and 4 or as the curved waveform shown in FIG. 6. In addition, the time represented by flat portions of the peak and trough of the vibration waveform of the cutting edge 2 may be set unequal at one of the peak and trough and at the other of one of the peak and trough.

Furthermore, in the fourth embodiment, although the amplitude a of the vibration is set as a<f/2 so that the narrow portions can be formed in the chips it is natural that the chips are produced completely in separation when a=f/2.

Incidentally, a case where the expression (4) is completely satisfied is described in the first to fourth embodiments. However, even if the expression (4) is not strictly satisfied, the front end position A and the rear end position B reached after going round the workpiece W therefrom in the direction opposite to the workpiece rotation direction C come close to each other in the circumferential direction of the workpiece W when the error between the right side and the left side of the expression (4) is not too great. Thus, the narrow portions can be formed in the chips, thus facilitating the breaking thereof.

This is true when the amplitude a of the vibration of the cutting edge 2 is sufficiently large, when the workpiece W is of a relatively brittle material and chips can be broken even if they are not too thinned, and when the peak and the trough of the vibration waveform of the cutting edge 2 are flat, as in the case of the fourth embodiment. For example, when the amplitude a of the cutting edge 2 is set as a<f/2, the front end position A is located at a position farther in the feed direction F than the rear end position B reached after going around in the direction opposite to the workpiece rotation direction C. Thus, even if the two positions do not strictly coincide with each other in the feed direction F, separation and breaking of the chips can be facilitated.

However, when the error between the right side and the left side of the expression (4) becomes too great, the front end position A and the rear end position B located at a position reached after going round the workpiece W from the front end position A along the locus L shift significantly in the circumferential direction of the workpiece W, so that the portions of the chips to be narrowed might be widened to prevent its breaking and to interfere with its sufficient treatment. In addition, when the difference between $t_d$ and $t_u$ is small, for example, with the shift of the front end position A and the rear end position B which should come close to each other, the front end position A might be located near a position reached after going round the workpiece W from the rear end position B. In such a case, the increase in the maximum feed $f_{max}$ cannot be sufficiently controlled, resulting in deterioration in the surface roughness $R_{max}$.

To prevent such a situation, the vibration of the cutting edge 2, although the expression (4) does not have to hold strictly, may preferably be controlled so that the error between its right side and the left side falls within the range of ±0.3 $t_{total}$, i.e., so that the following expression is satisfied:

$$T-0.3t_{total} \leq t_{total} \times n+t_d \leq T+0.3t_{total}.$$

On the other hand, although a case where the present invention is applied to an outer periphery cutting of the workpiece W has been described in the first to fourth embodiments, the present invention is not limited thereto.

For example, in the case of an end-face cutting work for feeding a cutting edge in a radial direction with respect to an axis of a workpiece W toward the workpiece W rotated around the axis so as to cut the end-face of the workpiece, by feeding the cutting edge in its feed direction, i.e., radial direction of the workpiece W while controlling and vibrating as described above, the machined surface roughness can be improved while achieving efficient separation of chips. In addition the inventive concept can be employed in a boring work for inserting a boring tool in a prepared hole formed in a workpiece W so as to cut the inner peripheral surface of the prepared hole, in a grooving work for feeding a grooving tool toward the outer peripheral surface of a workpiece W in its radial direction so as to form an annular groove, and in a cutting-off work for feeding a cut-off tool from the outer peripheral surface of a workpiece W until it reaches an axis of rotation so as to cut the workpiece W, a similar advantage can be obtained by controlling and vibrating the cutting edge in the feed direction.

However, in the case of work for feeding the cutting edge in the radial direction with respect to the axis of the workpiece W, such as an end-face cutting work, a grooving work and a cutting-off work, cutting speed (peripheral speed of the workpiece W at the position of the cutting edge) decreases as a distance between the axis of the workpiece W and the cutting edge decreases. To avoid the decrease in speed, the rotation speed of the workpiece W is sometimes changed in response to a feed of the cutting tool so as to effect a control for maintaining a constant cutting speed (control for maintaining the peripheral speed constant).

However, when such a control is effected, the period of rotation T of the workpiece W changes as the rotation speed of the workpiece changes, so that the expression (3) or the expression (4) does not hold. In such a case, the control may be effected so that the expression (4) can hold by changing the period of vibration $t_{total}$ of the cutting edge 2 in synchronization with the changes in the rotation speed and rotation period T of the workpiece W.

As described above, according to a cutting method using a vibratory cutting tool of the present invention, when letting a period of vibration of the cutting edge be $t_{total}$, and further the time required for the cutting edge to move from a farthest position in the feed direction to a farthest position in the direction opposite to the feed direction be $t_d$, and the time required for the cutting edge to move from the farthest position in the direction opposite to the feed direction to a next farthest position in the feed direction be $t_u$, the vibration of the cutting edge is controlled so that the period of rotation T of the workpiece is substantially equal to $t_{total} \times n + t_d$ (where n is 0 or a positive integer) and $t_d$ is not equal to $t_u$, whereby a maximum distance of the locus drawing spirals in the feed direction, i.e., a maximum feed can be controlled while securely facilitating separation and breaking of the chips.

Therefore, a situation that long-extending chips get caught in a workpiece, in a cutting tool and in a chuck of a lathe so as to interfere with a smooth cutting operation, and a machined surface of the workpiece and a cutting edge are harmed by the chips can be prevented, thus facilitating efficient creation of the chips. In addition, deterioration in the surface roughness of the workpiece can be prevented, thus achieving an improvement of the surface roughness, and increase in cutting resistance acting on the cutting edge can be restricted to prevent the cutting edge from being chipped or damaged, thus making it possible to extend tool life.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A cutting method comprising the steps of:
    rotating a workpiece around an axis;
    vibrating a cutting tool main body including a cutting edge in its feed direction;
    feeding said cutting tool main body including said cutting edge in its feed direction so as to cut said workpiece; and
    controlling the vibration of said cutting edge so that the following expressions are satisfied when letting a period of rotation of said workpiece be T, a period of vibration of said cutting edge be $t_{total}$, and further when letting the time required for said cutting edge to move from a farthest position in the feed direction to a farthest position in the direction opposite to the feed direction be $t_d$, and the time required for moving from the farthest position in the direction opposite to the feed direction to a next farthest position in the feed direction be $t_u$ in the period of vibration of said cutting edge:

$$T \approx t_{total} \times n + t_d$$

where n is 0 or a positive integer; and $$t_d \neq t_u.$$

2. A cutting method according to claim 1, wherein the step of controlling the vibration of said cutting edge controls the vibration so that the following expression is satisfied:

$$T-0.3t_{total} \leq t_{total} \times n + t_d \leq T+0.3t_{total}.$$

3. A cutting method according to claim 1, wherein the controlling step controls the vibration of said cutting edge to have a waveform defined by an amplitude of vibration of said cutting edge in the feed direction versus said period of vibration, wherein said waveform has substantially a triangular waveform.

4. A cutting method according to claim 1, wherein the controlling step controls the vibration of said cutting edge to have a waveform defined by an amplitude of vibration of said cutting edge in the feed direction versus said period of vibration, wherein said waveform has substantially a curved waveform.

5. A cutting method according to claim 1, wherein the controlling step further controls the vibration of said cutting edge to have a waveform defined by an amplitude of vibration of said cutting edge in the feed direction versus said period of vibration, wherein said waveform has a peak and a trough formed at extreme values of amplitude, and wherein at least one of said peak and trough thereof is flat.

6. A cutting method according to claim 2, wherein the controlling step further controls the vibration of said cutting edge to have a waveform defined by an amplitude of vibration of said cutting edge in the feed direction versus said period of vibration, wherein said waveform has substantially a triangular waveform.

7. A cutting method according to claim 2, wherein the controlling step further controls the vibration of said cutting edge to have a waveform defined by an amplitude of vibration of said cutting edge in the feed direction versus said period of vibration, wherein said waveform has substantially a curved waveform.

8. A cutting method according to claim 2, wherein the controlling step further controls the vibration of said cutting edge to have a waveform defined by an amplitude of vibration of said cutting edge in the feed direction versus said period of vibration, wherein said waveform has a peak and a trough formed at extreme values of amplitude, and wherein at least one of said peak and trough thereof is flat.

9. A cutting method according to claim 3, wherein the controlling step further controls said triangular waveform of said cutting edge to have a peak and a trough formed at extreme values of amplitude, and wherein at least one of said peak and trough thereof is flat.

10. A cutting method according to claim 6, wherein the controlling step further controls said triangular waveform of said cutting edge to have a peak and a trough formed at extreme values of amplitude, and wherein at least one of said peak and trough thereof is flat.

11. A cutting method according to claim 4, wherein the controlling step further controls said curved waveform of said cutting edge to have a peak and a trough formed at extreme values of amplitude, and wherein at least one of said peak and trough thereof is flat.

12. A cutting method according to claim 7, wherein the controlling step further controls said curved waveform of said cutting edge to have a peak and a trough formed at extreme values of amplitude, and wherein at least one of said peak and trough thereof is flat.

* * * * *